INVENTOR.
Hisao Maeda
BY
Meston & Meston

INVENTOR
Hisao Maeda

BY

Moslim & Moslim

FIG. 10
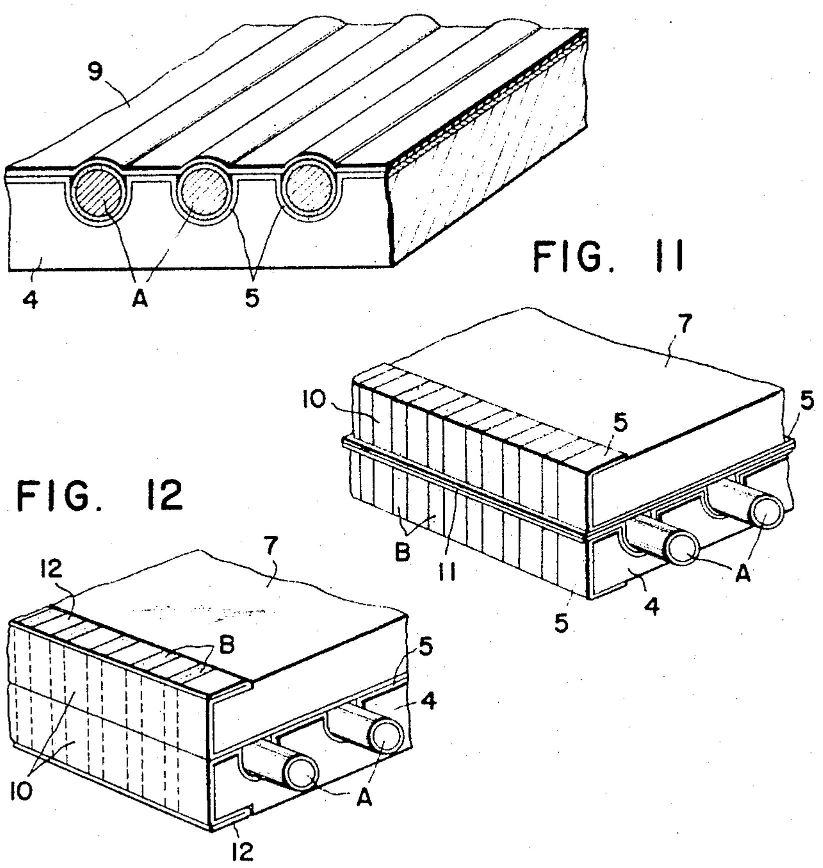
FIG. 10, FIG. 11, FIG. 12
FIG. 13
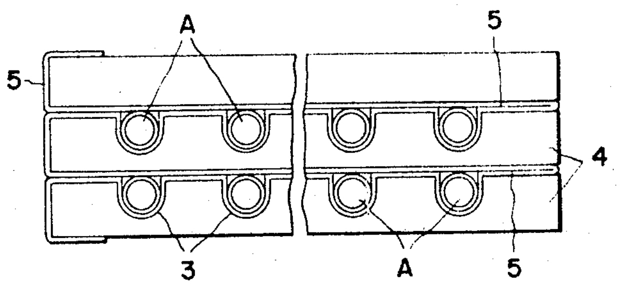
INVENTOR.
Hisao Maeda
BY
Meshkov & Meshkov Aug. 5, 1969 HISAO MAEDA 3,460,113

MAGNETIC MEMORY DEVICE WITH GROOVED SUBSTRATE CONTAINING BIT DRIVE LINES

Filed July 31, 1964 5 Sheets-Sheet 4

INVENTOR

Hisao Maeda

BY

Mestern & Mestern

INVENTOR
Hisao Maeda
BY
Mesten & Mesten

United States Patent Office 3,460,113

Patented Aug. 5, 1969

3,460,113 MAGNETIC MEMORY DEVICE WITH GROOVED SUBSTRATE CONTAINING BIT DRIVE LINES

Hisao Maeda, 211 Minamisenzoku-machi, Ota-ku, Tokyo-to, Japan

Filed July 31, 1964, Ser. No. 386,665
Claims priority, application Japan, Aug. 3, 1963, 38/41,470; Aug. 19, 1963, 38/44,257; Aug. 26, 1963, 38/64,076; Aug. 31, 1963, 38/66,000, 38/66,001; Sept. 6, 1963, 38/67,001; Mar. 25, 1964, 39/16,142
Int. Cl. G11b 5/62
U.S. Cl. 340—174 12 Claims The present invention relates to improvements in a magnetic memory device in which conductors each having a magnetic coating film thereon are used as the memory wires and driving conductors are assembled with said memory wires so that current passing through the driving wires causes variation of the magnetic characteristic of the memory wires.

An essential object of the present invention is to provide an improved memory device of the type as described above, which has very large output power and uniformity in the output and is simple and inexpensive to manufacture, thereby being easily adaptable to efficient and easy mass-production.

Another object of the present invention is to provide a method of manufacturing said improved device in a simple and low-cost manner.

Said objects and other objects of the present invention have been attained by a memory device characterized by an arrangement and construction comprising, as essential elements, a base plate having a plurality of parallel grooves, and a thin sheet of insulating material having a plurality of driving wires consisting of thin conductive material adhering thereon, said film being caused to adhere onto the grooved surface of said base plate in such a manner that the driving wires are crossed with the memory wires which are engaged in said grooves, each of said wires consisting of a core conductor and a magnetic film covering said core conductor.

Further characteristic features and advantages of the present invention will become more apparent from the following detailed description of preferred embodiments of the memory device and method of manufacturing said device, according to this invention, when taken in conjunction with the accompanying drawings, in which like or equivalent members are designated by like reference numerals and characters, and in which.

FIGS. 7, 8, 9, 13, and 14 are edge views showing, respectively, other different embodiments of the present invention;

FIGS. 10, 11, and 12 are perspective views showing, respectively, further different embodiments of the present invention; and FIGS. 15, 16, 17, and 18 are edge views showing, respectively, different methods of manufacturing the memory device according to the present invention.

Figure 1:
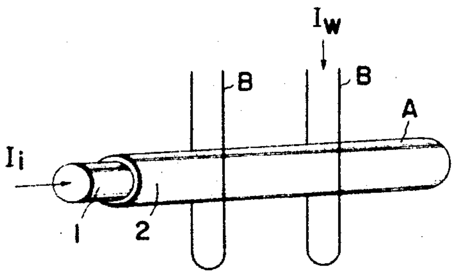
FIG. 1 is a perspective view showing principal construction of an elemental memory device to be used in the memory device according to this invention.

The conventional magnetic memory device utilizing conductors each having a magnetic coating film thereon comprises wires A each of which, as shown in FIG. 1, consists of a conductor core wire 1 with a magnetic coating film 2 coated on its outer surface by electroplating or evaporation method and word driving conductors B which intersect and are insulated from said wires A. Said wires A will be referred to hereinbelow as "memory wires." By such a memory device as described above, an information signal can be written in the magnetic film 2 at the intersection of the said wires A and B by passing a word driving current $I_W$ and an information current $I_b$, respectively, through the wires B and A, or vice versa. Of course, in practice, a matrix consisting of from several hundreds to several thousands of the bits formed at the intersections of said conductors can be constructed by utilizing a plurality of the memory wires and a plurality of the driving wires.

However, when the conductors A and B are merely intersected, the closeness of contact between said wires A and B is relatively low, and the magnetic operation cannot be fully accomplished, thus decreasing the output power and efficiency. Accordingly, it is preferable to make each driving wire B intersect the memory wires A in such a manner that said driving wire is disposed along the periphery of said wires A.

The abovementioned problem can be solved according to this invention, for example by providing a plurality of parallel grooves on one surface of an insulating base plate, finishing said one surface by a suitable treatment such as lapping, bonding an insulating film provided at its one surface with a plurality of parallel driving wires adhereing thereon onto said one surface of said base plate in such a manner that said parallel driving wires intersect said grooves, thus producing a matrix plate, and joining two of said matrix plates together in the state of holding one memory wire in each hole formed by a pair of confronting grooves of the two matrix plates. Such embodiment is shown in FIG. 2, in which a matrix plate consists of an insulating base plate 4 having a plurality of parallel grooves 3 on one surface thereof, each of said grooves being of semi-circular cross section, and said one surface being finished by a suitable treatment such as lapping, and a sheet of an insulating material to serve as film 5 provided with a plurality of thin parallel driving conductors B adhering thereon, hereinbelow referred to as "film," said film 5 being bonded onto said finished surface of the matrix plate 4 along the concave surfaces of the grooves and the surfaces 6 between adjacent grooves in such a manner that said parallel driving conductors B intersect said grooves, and the surface of said conductor adheres closely onto said grooves.

Figures 2, 3:
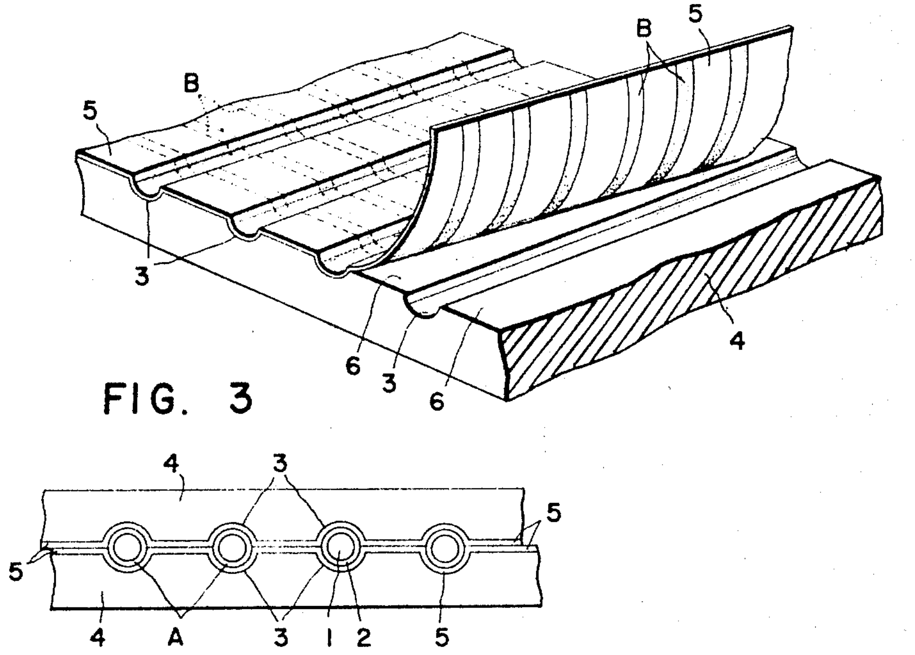
FIG. 2 is a perspective view showing a base plate of the memory device according to this invention.
FIG. 3 is an edge view of one embodiment of the present invention.

Two of the abovementioned matrix plates are joined together in the state of holding a memory wire A in each hole formed by a pair of confronting grooves of the two said matrix plates, whereby a magnetic memory device as shown in FIG. 3 is obtained. The insulating film 5 can be made of, for example, a conventional insulating paper, a synthetic resin sheet or any other thin flexible insulating material. The driving conductors B can be caused to adhere onto the film 5 by a suitable procedure such as plating, evaporation or deposition of an electroconductive metal. Furthermore, bonding of the film 5 onto the concave surfaces of the grooves 3 can be effectively attained by pressing.

In the device of FIG. 3, when the upper and lower driving conductors B forming a pair are connected to each other at their ends, a one turn coil is formed around each memory wire.

According to the embodiment of FIG. 3, the following advantages can be obtained. Since it is necessary only to bond the film onto a matrix plate and to place the memory wires into the grooves of the matrix plate, manufacturing of the device is very easy, whereby low-cost mass production is possible in comparison with the conventional case in which driving wires are directly printed onto the base plate. The film 5 acts as a buffer or a protective member of the memory wire A, and the magnetic film of the memory wire A is not damaged, whereby magnetic distortion will not occur in the said memory wire; and since the matrix plate surface onto which a film is to be bonded is made to be substantially flat by suitable procedure such as lapping, the gaps between the driving wires and the memory wires are made extremely uniform, whereby variations of the output voltage with respect to each bit is effectively decreased. Furthermore, since in the matrix plate 4, the driving conductor surfaces of the film 5 are faced toward the groove surface of the base plate 4, the memory wires A are effectively insulated from the driving wires B of the confronting matrix plate by said film 5.

Figure 4:
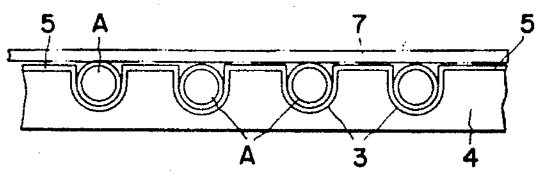
FIG. 4 is an edge view of another embodiment of the present invention.

In embodying this invention, only one matrix plate consisting of a base plate 4 provided with a plurality of parallel grooves 3, a film 5 memory wires A inserted in said grooves, and a covering plate 7 can be adopted as shown in FIG. 4 instead of two confronting matrix plates. In the embodiment of FIG. 4, however, the depth of each groove is selected to be almost equal to the diameter of the memory wire A so that each memory A is almost completely accommodated in its corresponding groove 3, and a covering plate 7 is bonded onto the matrix plate 4 so as to cover the grooves 3 and memory wires A.

According to the embodiment of FIG. 4, almost all of the surface of each memory wire A can be surrounded by the driving wires B of the film 5.

Figure 5:
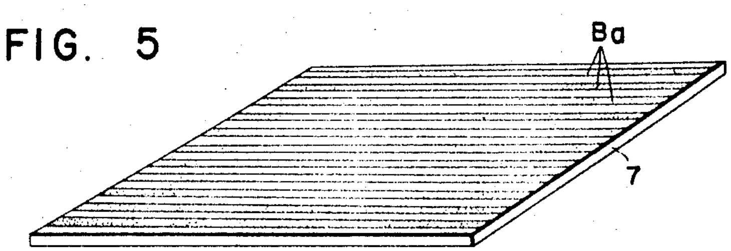
FIGS. 5 and 6 are perspective views showing, respectively, different covering plates to be used in the memory device according to this invention.

Flatness of the covering plate 7 is not always necessary, and this plate can be made of an insulating material, such as synthetic resin, and provided at its inside surface with a plurality of driving wires B*a* corresponding to the driving wire B as shown in FIG. 5, said wires B*a* being printed onto said inside surface by a suitable procedure such as bonding, evaporation, or plating. In this case, it is possible, as shown in FIG. 7, to form an equivalent of a one turn coil around each memory wire A by connecting the confronting wires B and B*a* to each other, at their ends, and, furthermore, when not only the surface of the base plate 4, but also the adhering surface of the covering plate 7 are finished by lapping, the covering plate 7 can be closely bonded onto the matrix plate 4.

Figure 6:
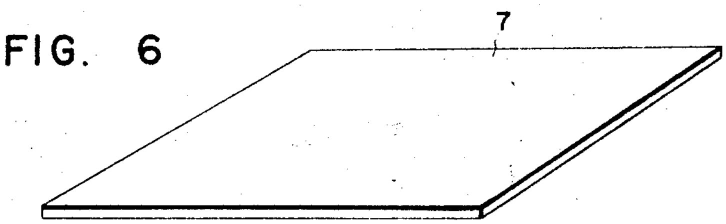

In FIG. 6, the plate 7 represents a cover for an embodiment wherein a plurality of the driving conductors are not provided. The said plate can be a sheet of insulating or conducting material, depending on the embodiments which will be described.

Figure 7:
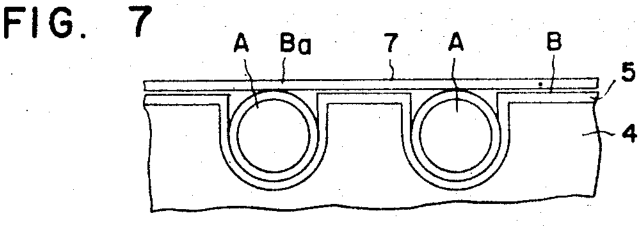

The covering plate 7 of the embodiments of FIGS. 4 and 7 can be made of a conducting plate pressed against the matrix plate 4 to serve as the return conductor instead of the plurality of conductors B*a*.

Figure 8:
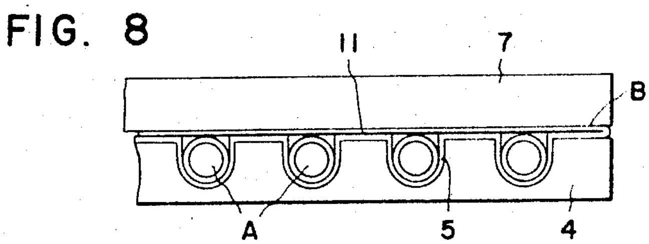

In FIG. 8, a construction is shown wherein the film 5 is folded with insertion of a insulating layer 11. This folded film is secured by a covering plate 7 made of insulating material. According to this embodiment, the connections between the ends of the conductors B and B*a* of the arrangements previously described are unnecessary, enabling simpler assembly of this form of magnetic memory device of this invention.

Furthermore, each of memory wires A may be projected somewhat out of its corresponding groove 3 by suitable selection of the depth of the groove and directly or through a suitable buffering member be pressed or held by the covering plate 7, whereby the gap between the wires A and B can be equalized.

Of course, the covering plate 7 may be provided, on its contact surface, with shallow grooves capable of engaging with the memory wire A.

According to the embodiments illustrated in FIG. 4 to FIG. 8, since the driving wires can be uniformly arranged along the periphery of the memory wires A, there are advantages in that a large output power can be derived, variation in the output power is decreased, and manufacturing is greatly facilitated, thereby providing mass produtive and inexpensive memory devices. Furthermore, since the return conductive path of the driving wires is situated on the same peripheral points of the memory wires, mutual interference between the adjacent bits is decreased, thus remarkably improving the signal-to-noise ratio, and protection and securing of the memory wires A against mechanical shocks and vibration are effectively attained.

Figure 9:
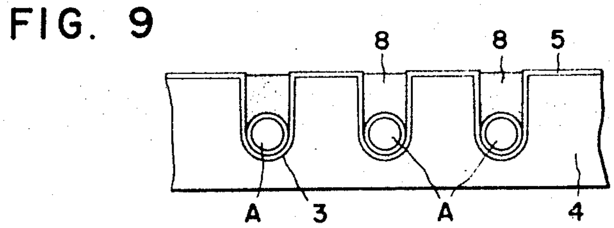

According to this invention, the covering plate 7 for holding the memory wires A may be substituted by a filler 8 made of a setting material, such as epoxy resin, and the like as shown in FIG. 9. In this case, the depth of the grooves 3 is selected to be larger than the diameter of the plated wire A and the filler 8 is packed over each memory wire A in each groove 3. In the said construction of FIG. 9, the memory wires A can be effectively protected and held by the filler 8 and firmly pressed onto the film 5, thus establishing a uniform gap between the memory wires A and the printed driving wires B.

Instead of covering plate 7 of the embodiment of FIG. 4, a flexible film 9 adhering to or bonded to the insulating film 5 can be used as shown in FIG. 10. In this case, the depth of each groove 3 is preferably selected to be smaller than the diameter of the memory wire A, and the said flexible film 9 may be provided with a plurality of parallel driving wires B*a* each connected at its one end to the confronting driving wire B of the insulating film 5.

According to the construction of FIG. 10, the relative positions between the memory wires A and the driving conductors B will not be varied because of the flexible covering film 9, even if the base plate 4 is somewhat bent or deformed.

Furthermore, according to this invention, the film 5 provided at one surface thereof with a plurality of parallel driving wires B can be extended out of the end or ends of the base plate 4 and/or the covering plate 7, and said extended part or parts are bent and bonded onto said end or ends. Such embodiments are shown in FIGS. 11 and 12.

The embodiment of FIG. 11 corresponds to the embodiment of FIG. 8, where the film 5 is bent at its both ends and these bent parts 10 are bonded onto the base plate 4 and covering plate 7 so as to expose the driving wires B.

The embodiment of FIG. 12 is the same as the embodiment of FIG. 11 except that the film 5 is arranged in the folded back state. In this case, at the extended part of the film 5, the driving wires B are not directly exposed, so that the end part of the film 5 is folded as shown by the parts 12 to expose the driving wires B.

According to the embodiments of FIGS. 11 and 12, since the end parts of the driving wires B are directly exposed, said exposed parts can be utilized as the terminals thereof, so that the connection of the memory device to other components of a circuit is extremely simplified.

According to this invention, a plurality of the memory devices such as those illustrated in FIGS. 3 to 12 can be superimposed, and the driving wires B or the memory wires A in each stage can be connected at their end parts in series or parallel. FIG. 13 corresponds to such embodiment obtained by superimposing two stages, each consisting of the embodiment of FIG. 11, and FIG. 14 corresponds to such embodiment obtained by superimposing two stages each consisting of the embodiment of FIG. 3.

Figure 14:
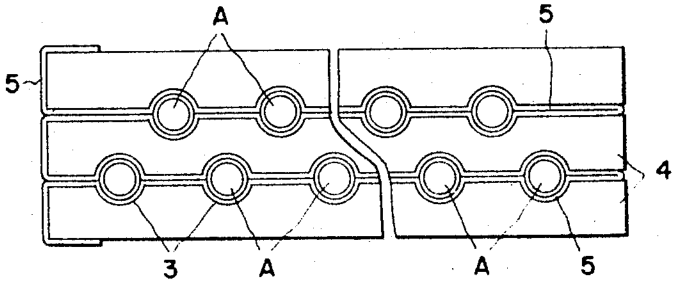

According to the embodiments of FIGS. 13 and 14, an elemental memory device can be assembled in such a manner, so that miniaturization of a matrix memory device having a plurality of bits is made possible, and moreover, wiring becomes simplified because the terminals are easily accessible in spite of such miniaturized construction. The film 5 can be bonded onto the plate 4 and the grooves 3 thereof by any procedure, but this bonding can be accomplished in a particularly simple manner by pressing the film 5 into the grooves successively by means of teeth of a rotating toothed wheel or a plunger which moves up and down. For example, as shown in FIG. 15, the printed film 7 having a plurality of printed driving wires B thereon is placed on the base plate 4 provided with a plurality of parallel grooves 3 and a toothed wheel 13 having teeth adapted to engage successively with grooves 3 is rotated in the arrow direction, whereby the film 5 is secured into the grooves 3.

Figure 16:
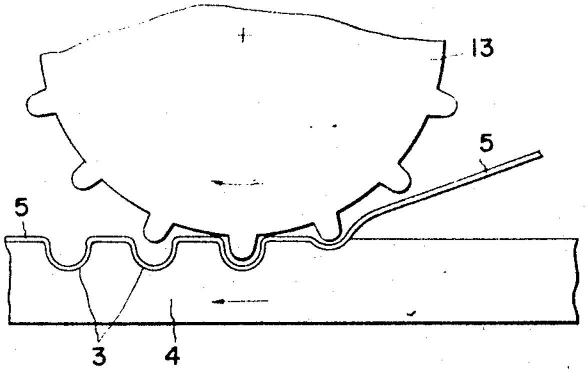

In FIG. 16 there is shown another modified example, in which the base plate 5 is not previously provided with grooves 3 and the grooves 3 are forcibly formed by the teeth of the toothed wheel 13 while the film 5 is caused to adhere to the surfaces of the grooves 3 and base plate 4.

Figure 15:
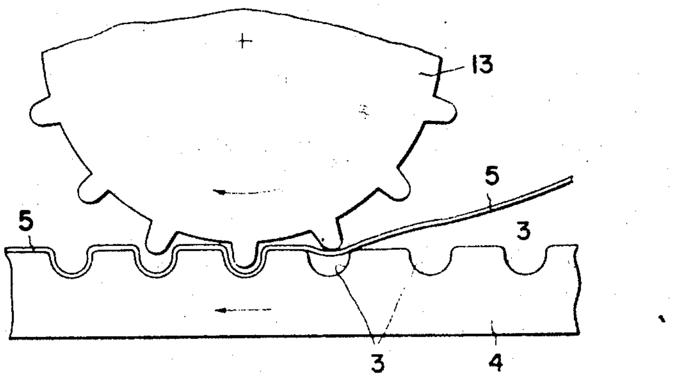

In both cases of FIGS. 15 and 16, if necessary, the film 5 may be secured onto the surfaces of the grooves 3 and the base plate 4 by using a heated toothed wheel 13.

In the case of FIG. 16, if a thermoplastic synthetic resin is used as the base plate 4, the operation of securing the film will be facilitated. If the film is secured onto the base plate 4 by means of an adhesive agent, cold working may be adopted.

Figure 17:
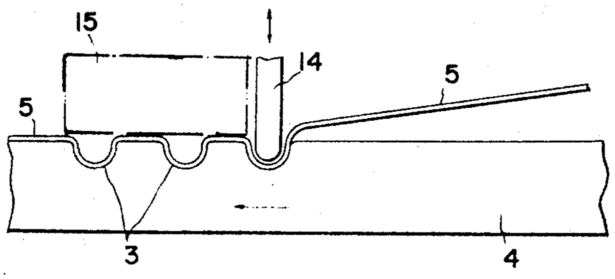
Figure 18:
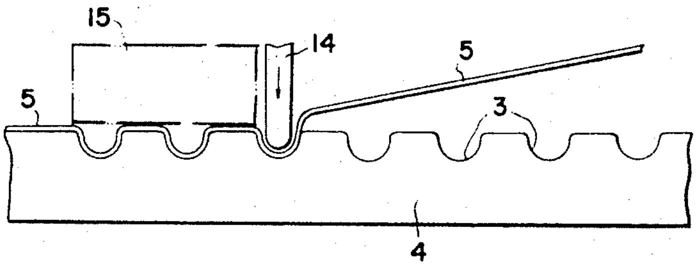

Instead of using the toothed wheel 13, the film 5 may be secured by merely using a punch 14 which is moved up and down as shown in FIGS. 17 and 18. FIG. 18 corresponds to the case in which the base plate 4 is previously provided with the grooves, and FIG. 17 corresponds to the case in which the grooves of the base plate 4 are successively formed by the punch 14 during the securing of the film 5 onto the surfaces of the grooves and the base plate 4. In both cases of FIGS. 17 and 18, also, the film 5 may be secured by hot working or cold working. According to the methods of working illustrated in FIGS. 17 and 18, since it is necessary merely to move the punch up and down, the operation is very simple. Furthermore, in FIGS. 17 and 18, the numeral 15 indicates a holding member for preventing the secured film from being detached.

The present invention is not restricted to the above mentioned embodiments thereof, and numerous other modifications can be made. For example, two or more memory wires may be placed in each groove of the base plate.

What is claimed is:

1. A magnetic memory device which comprises a base plate having a plurality of parallel grooves recessed in a surface, a film having a plurality of parallel driving conductors thereon, said film being secured onto the grooved surface of said base plate in such a manner that the driving conductors are crossed with said grooves, and memory wires fitted in said grooves, each of said memory wires consisting of a core conductor and a magnetic film covering said core conductor.

2. A magnetic memory device which comprises an insulating base plate having on one surface thereof a plurality of parallel grooves, said one surface being finished so as to be flat; an insulating film provided on its one surface with a plurality of parallel driving conductors adhering thereon, said film being secured onto the grooved surface of said base plate in such a manner that said driving wires and crossed with said grooves; and memory wires fitted in said grooves, each of said memory wires consisting of a core conductor and a magnetic film covering said core conductor.

3. A magnetic memory device in which there are provided two matrix plates each of which comprises an insulating base plate having on one surface thereof a plurality of parallel grooves, said one surface being finished so as to be flat; an insulating film provided on its one surface with a plurality of parallel driving wires adhering thereon, said film being secured onto the grooved surface of said base plate in such a manner that said driving wires are crossed with said grooves, and memory wires which are fitted in said grooves, each of said memory wires consisting of a core conductor and a magnetic film covering said core conductor, said two matrix plates being joined together to hold one memory wire in each passage formed by a pair of confronting grooves of the matrix plates.

4. A magnetic memory device which comprises: memory wires each consisting of a core conductor and a magnetic film covering said core conductor; a base plate having on one surface thereof a plurality of parallel grooves the depth of which is substantially equal to the diameter of said memory wire; a flexible film having a plurality of parallel driving conductors provided thereon, said film being secured onto the grooved surface of said base plate in such a manner that said driving wires are crossed with said grooves; and a covering holding the memory wires fitted in said grooves.

5. A magnetic memory device which comprises: memory wires each consisting of a core conductor and a magnetic film covering said core conductor; a base plate having on one surface thereof a plurality of parallel grooves the depth of said is larger than the diameter of said memory wire; a film having a plurality of parallel driving wires provided thereon, said film being secured onto the grooved surface of said base plate in such a manner that said driving wires are crossed with said grooves; and an insulating filler packed into each of said grooves after insertion of one memory wire in said groove.

6. A magnetic memory device which comprises: memory wires each consisting of a core conductor and a magnetic film coated thereon; a base plate having on one surface thereof a plurality of parallel grooves; a film having a plurality of parallel driving conductors provided thereon, said film being secured onto the grooved surface of said base plate in such a manner that said driving wires are crossed with said grooves; and a flexible covering which is secured onto the film after insertion of the memory wires into said grooves to cover and hold said memory wires.

7. A magnetic memory device according to claim 6 in which the flexible covering is a second film provided with a plurality of parallel driving conductors thereon which are used as the return conductive member of the main driving conductors.

8. A magnetic memory device which comprises: memory wires each consisting of a core conductor and a magnetic film coated thereon; a base plate having on one surface thereof a plurality of parallel grooves each holding a memory wire; and a film having a plurality of parallel driving conductor provided thereon, said film being secured onto the grooved surface of said base plate in such a manner that said driving wires are crossed with said grooves, the end of said film being extended out of said base plate, bent and secured onto the end part of said base plate, thereby to expose the driving wires at said end part, the parts of the driving wires so exposed being used as the terminals.

9. A magnetic memory device according to claim 4, in which the film is extended out of the covering plate, bent and secured at its extended part onto the end part of said covering plate, thereby to expose the driving conductors at said end part.

10. A magnetic memory device according to claim 1, in which the film provided with a plurality of parallel driving conductors is folded to form two superimposed layers the driving conductors of one of said layers being used as the return conductive members.

11. A magnetic memory device according to claim 10, in which the film is extended out of the covering plate and base plate, bent and secured at its extended parts onto the end parts of said plates, thereby to expose the driving wires at said end parts.

12. A magnetic memory device according to claim 1, wherein two or more memory elements are superimposed on each other to form two or more stages, and the driving wires of all stages or the memory wires of all stages are connected at their ends in series or parallel.

References Cited

UNITED STATES PATENTS

| | | | |
|---|---|---|---|
| 2,711,983 | 6/1955 | Hoyt | 174—68.5 |
| 2,997,521 | 8/1961 | Dahlgren | 174—68.5 |
| 3,042,997 | 7/1962 | Anderson et al. | 340—174 |
| 3,105,962 | 10/1963 | Bobeck | 340—174 |
| 3,201,767 | 8/1965 | Bradley | 340—174 |
| 3,213,430 | 10/1965 | Oshima et al. | 340—174 |
| 3,245,057 | 4/1966 | Downing | 340—174 |
| 3,267,443 | 8/1966 | Brownlow | 340—174 |

BERNARD KONICK, Primary Examiner

B. L. HALEY, Assistant Examiner

U.S. Cl. X.R.

29—603